United States Patent
Kubo et al.

(10) Patent No.: US 11,220,465 B2
(45) Date of Patent: Jan. 11, 2022

(54) METHOD FOR PRODUCING SIC/SIC COMPOSITE MATERIAL

(71) Applicant: IBIDEN CO., LTD., Ogaki (JP)

(72) Inventors: Syuichi Kubo, Gifu (JP); Takashi Takagi, Gifu (JP); Akihide Kawaguchi, Gifu (JP); Hideo Kato, Gifu (JP); Yuki Hokazono, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 154 days.

(21) Appl. No.: 16/616,781

(22) PCT Filed: May 25, 2018

(86) PCT No.: PCT/JP2018/020243
§ 371 (c)(1),
(2) Date: Nov. 25, 2019

(87) PCT Pub. No.: WO2018/216816
PCT Pub. Date: Nov. 29, 2018

(65) Prior Publication Data
US 2020/0377419 A1   Dec. 3, 2020

(51) Int. Cl.
*C04B 35/80* (2006.01)
*C04B 35/565* (2006.01)
(Continued)

(52) U.S. Cl.
CPC ............ *C04B 35/80* (2013.01); *C04B 35/565* (2013.01); *C04B 35/6342* (2013.01);
(Continued)

(58) Field of Classification Search
CPC . C04B 35/80; C04B 35/565; C04B 35/63416; C04B 35/6342;
(Continued)

(56) References Cited

U.S. PATENT DOCUMENTS 5,492,769 A * 2/1996 Pryor ................. C23C 26/02
                                                     428/552
5,955,391 A   9/1999 Kameda et al.
(Continued)

FOREIGN PATENT DOCUMENTS

JP    H09-268065 A    10/1997
JP    H11-049570 A    2/1999
(Continued)

OTHER PUBLICATIONS

PCT/ISA/210 from International Application PCT/JP2018/020243 with the English translation thereof.
PCT/ISA/237 from International Application PCT/JP2018/020243.

*Primary Examiner* — Noah S Wiese
(74) *Attorney, Agent, or Firm* — Carrier Blackman & Associates, P.C.; William D. Blackman; Joseph P. Carrier

(57) ABSTRACT

A method for producing SiC/SiC composite material according to the present invention includes impregnating a substrate with a slurry containing particles of a flaky lubricant to obtain an impregnated body, drying out a solvent of the slurry from the impregnated body, forming an interface layer on surfaces of the SiC fibers by bending the impregnated body, and transferring the particles of the flaky lubricant to the surfaces of the SiC fibers while stretching the particles, and forming a SiC matrix inside the substrate on which the interface layer is formed. Since a thin interface layer of the flaky lubricant can be formed on the surfaces of the SiC fibers by transferring the flaky lubricant to the surfaces of the SiC fibers, the interface layer reaching inside of the substrate can be easily formed.

4 Claims, 3 Drawing Sheets

(51) Int. Cl.
*C04B 35/634* (2006.01)
*C04B 41/00* (2006.01)

(52) U.S. Cl.
CPC .. *C04B 35/63416* (2013.01); *C04B 35/63452* (2013.01); *C04B 35/63456* (2013.01); *C04B 35/63496* (2013.01); *C04B 41/0072* (2013.01)

(58) Field of Classification Search
CPC ........ C04B 35/63452; C04B 35/63456; C04B 35/63496; C04B 41/0072; C04B 2235/5292; C04B 2235/386
See application file for complete search history.

(56) References Cited

U.S. PATENT DOCUMENTS

| | | |
|---|---|---|
| 7,427,428 B1 | 9/2008 | DiCarlo et al. |
| 2005/0001361 A1 | 1/2005 | Kohyama et al. |
| 2010/0284810 A1* | 11/2010 | Corman ................ C04B 35/80 416/179 |
| 2017/0190628 A1* | 7/2017 | Easter .................... C04B 35/80 |

FOREIGN PATENT DOCUMENTS

| | | |
|---|---|---|
| JP | 2002-356381 A | 12/2002 |
| JP | 2003-176182 A | 6/2003 |

\* cited by examiner

METHOD FOR PRODUCING SIC/SIC COMPOSITE MATERIAL

TECHNICAL FIELD

The present invention relates to a method for producing SiC/SiC composite material.

BACKGROUND ART

Since a SiC/SiC composite material has high heat resistance and oxidation resistance, the use thereof is being studied in various fields. The composite material is expected to be used in severe applications such as heat resistant parts such as gas turbines, jet engine blades and shrouds, nuclear reactor parts, high-temperature reactor equipment parts, and the like.

Patent Literature 1 discloses, as a SiC/SiC material having heat resistance and oxidation resistance even in a high temperature usage environment at 1500° C. or higher and exhibiting excellent damage tolerance, strength and the like, a SiC fiber reinforced SiC composite material in which surfaces of silicon carbide fibers including, as a chemical composition, Si: 50 to 65 wt %, C: 25 to 40 wt %, and 0:0.01 to 13 wt % and having a fiber diameter of 8 to 20 μm are coated with BN by chemical deposition at a thickness of 0.01 to 2 μm, a composition obtained by blending a polycarbosilane with an organic solvent is applied to an assembly of the coated silicon carbide fibers such as tow, felt or fabric to form a pre-preg, the pre-pregs are laminated, press-formed, cured at 200° C. to 300° C., and then fired at 1000° C. to 1400° C. in argon, in an oxygen-free atmosphere or in vacuum to obtain a sintered body, and further, as a densification treatment step, a step of impregnating a composition obtained by blending a polycarbosilane with an organic solvent and carrying out firing at 1000° C. to 1400° C. is repeated to obtain a matrix with a porosity of 20% or less.

CITATION LIST

Patent Literature

Patent Literature 1: JP-A-H11-049570

SUMMARY OF INVENTION

Technical Problem

However, in the invention described above, the SiC fiber reinforced SiC composite material is produced through such many steps that the surfaces of silicon carbide fibers are coated with BN by chemical deposition, a composition obtained by blending a polycarbosilane with an organic solvent is applied to an assembly of the coated silicon carbide fibers such as tow, felt or fabric to form a pre-preg, the pre-pregs are laminated, press-formed, cured at 200° C. to 300° C., and then fired at 1000° C. to 1400° C. in argon, in an oxygen-free atmosphere or in vacuum to obtain a sintered body, and further, as a densification treatment step, a step of impregnating a composition obtained by blending a polycarbosilane with an organic solvent and carrying out firing at 1000° C. to 1400° C. is repeated so as to obtain a matrix having a porosity of 20% or less.

That is, the above method is a production method including many steps of repeating impregnation of polycarbosilane and firing after the chemical vapor deposition of BN. Since BN is formed by chemical vapor deposition, it is difficult to form a sufficient interface layer inside a substrate and exhibit composite properties by integrating aggregate and a matrix. When vapor phase growth is performed so that an interfacial layer reaching inside of the substrate can be formed, film formation is slow.

An object of the present invention is to provide a method for producing SiC/SiC composite material in which an interface layer reaching inside of the substrate can be easily formed in order to solve the above problems.

Solution to Problem

A method for producing SiC/SiC composite material for solving the above problem includes the followings.

(1) A method for producing SiC/SiC composite material including a substrate formed of a strand formed by bundling a plurality of SiC fibers, and a SiC matrix, the method including: an impregnation step of impregnating the substrate with a slurry containing particles of a flaky lubricant to obtain an impregnated body; a drying step of drying out a solvent of the slurry from the impregnated body; an interface layer formation step of bending the impregnated body, and transferring the particles of the flaky lubricant to surfaces of the SiC fibers while stretching the particles, to form an interface layer on the surfaces; and a matrix formation step of forming a SiC matrix inside the substrate on which the interface layer is formed.

According to the method for producing SiC/SiC composite material, since the method includes an impregnation step of impregnating the substrate with a slurry containing particles of a flaky lubricant to obtain an impregnated body, a drying step of drying out a solvent of the slurry from the impregnated body, and an interface layer formation step of bending the impregnated body, and transferring the particles of the flaky lubricant to surfaces of the SiC fibers while stretching the particles, to form an interface layer on the surfaces, after the particles of the flaky lubricant are impregnated in the gaps between the SiC fibers, the solvent of the slurry is dried, the impregnated body is bent, and the particles of the flaky lubricant are transferred to the surfaces of the SiC fibers so that a thin interface layer of the flaky lubricant can be formed on the surfaces of the SiC fibers.

In the transfer, the particles are transferred to the fiber surfaces while the particles are stretched. The particles are stretched by rubbing the fibers together. Thus, a thin interface layer can be formed, the particles inside the bundled fibers can be transferred.

Since the flaky lubricant is formed of a hexagonal crystal in which a c-axis direction is bound by a weak bond, when the impregnated body is bent, the crystal is peeled off by the frictional force, and a thin film can be obtained.

Bending the impregnated body is not particularly limited to rolling a flat body into a cylindrical shape or being a flat body into a corrugated shape, and a body which has been once bent may be returned to its original shape. By this operation, the crystals of the flaky lubricant impregnated between the SiC fibers are peeled off, the surfaces are scraped off, and the lubricant is attached to the SiC fibers, so that the interface layer can be formed.

In the present invention, since the interface layer is an aggregate of particles of the flaky lubricant and is not grown in a vapor phase, the interface layer does not easily become the origin of cracks and is not easily broken even when being bent. Therefore, it is easy to shape a strand after the strand is impregnated with the flaky lubricant. In addition, since the flaky lubricant easily becomes finer, the lubricant is easily spread to the inside of the substrate and thus the aggregate and the matrix can be prevented from being integrated even inside the substrate by a simple method.

It is preferable that the method for producing SiC/SiC composite material according to the present invention adopts the following aspects.

(2) The flaky lubricant includes at least one selected from carbon or boron nitride particles.

Since the flaky lubricant has self-lubricating properties, it is possible to spread the interface layer on the surfaces of the SiC fibers by bending the impregnated body. Since carbon or boron nitride is difficult to be thermally decomposed and does not generate corrosive gas even when decomposed, carbon or boron nitride can be suitably used in the method for producing SiC/SiC composite material of the present invention.

(3) The slurry further contains a binder resin.

Since the slurry used in the impregnation step contains a binder resin, the slurry is firmly attached to the SiC fibers and can be prevented from falling off until the matrix formation step. When the substrate is heated until the matrix formation step, the binder resin is thermally decomposed and removed or carbonized.

(4) The matrix formation step adopts a CVI method, a PIP method, or a MI method.

Although a method for forming a matrix in the method for producing SiC/SiC composite material according to the present invention is not particularly limited, a CVI method, a PIP method, or a MI method can be used.

In a chemical vapor infiltration (CVI) method, a matrix is formed by vapor-phase impregnation of SiC in the gap between the SiC fibers on which an interface layer is formed. In a polymer infiltration and pyrolysis (PIP) method, a SiC matrix can be formed by impregnating a substrate with a SiC precursor, and curing and firing the substrate. In a melt infiltration (MI) method, after the substrate is impregnated with a carbon source, the substrate is impregnated with molten silicon, and the carbon source is allowed to react with molten silicon, so that a reaction sintered SiC can be obtained. As the carbon source in the MI method, in addition to carbon particles, a carbon precursor and the like can be used. In a case of using carbon particles, the carbon particles can be dispersed in a solvent and impregnated with a carbon source in the form of slurry. In a case of using a carbon precursor, phenolic resin, furan resin, polyvinyl alcohol, epoxy resin, polyvinyl chloride, polyacrylonitrile, pitch, and the like can be used. These carbon precursors are impregnated, then cured and fired so that the substrate can be impregnated with a carbon source.

(5) Before the impregnation step, a washing step of washing the strand is further provided.

The strand formed by bundling the plurality of SiC fibers may be coated with a sizing agent so that the SiC fibers do not fall apart or dirt may be attached to the surfaces of the SiC fibers. Since the SiC fiber is a hard ceramic, when the flaky lubricant is rubbed on the surface, the flaky lubricant can be more efficiently scraped and a thin interface layer can be formed on the surface. However, when a sizing agent or dirt is attached to the surface, the flaky lubricant is not easily scraped and the adhesion is also reduced. In addition, when the sizing agent is attached, the sizing agent serves as a binder and the SiC fibers are brought into close contact with each other. Thus, it is difficult to introduce the flaky lubricant into the gap between the SiC fibers.

Therefore, since the washing step of washing the strand is provided before the impregnation step, the flaky lubricant can be easily introduced onto the surfaces of the SiC fibers and an interface layer can be more efficiently formed.

Advantageous Effects of Invention

According to a method for producing SiC/SiC composite material according to the present invention, since a thin interface layer of a flaky lubricant can be formed on surfaces of SiC fibers by, after impregnating particles of a flaky lubricant in gaps between the SiC fibers, drying a solvent, bending the impregnated body, and transferring the flaky lubricant to the surfaces of the SiC fibers, the interface layer reaching inside of the substrate can be easily formed. In addition, since the interface layer is an aggregate of the particles of the flaky lubricant and is not grown in a vapor phase, the interface layer does not easily become the origin of cracks and is not easily broken even when being bent. Therefore, it is easy to shape the strand after being impregnated with the flaky lubricant. Further, since the flaky lubricant easily becomes finer, the lubricant is easily spread to the inside of the substrate and thus the aggregate and the matrix can be prevented from being integrated even inside the substrate by a simple method.

BRIEF DESCRIPTION OF DRAWINGS

FIG. 1A shows a production process of Embodiment 1, and FIG. 1B shows a production process of Embodiment 2.

FIG. 2A is a flow chart, and FIG. 2B is a schematic view in each flow.

FIG. 3A is a flow chart, and FIG. 3B is a schematic view in each flow.

DESCRIPTION OF EMBODIMENTS

Detailed Description of the Invention

Figure 1A:
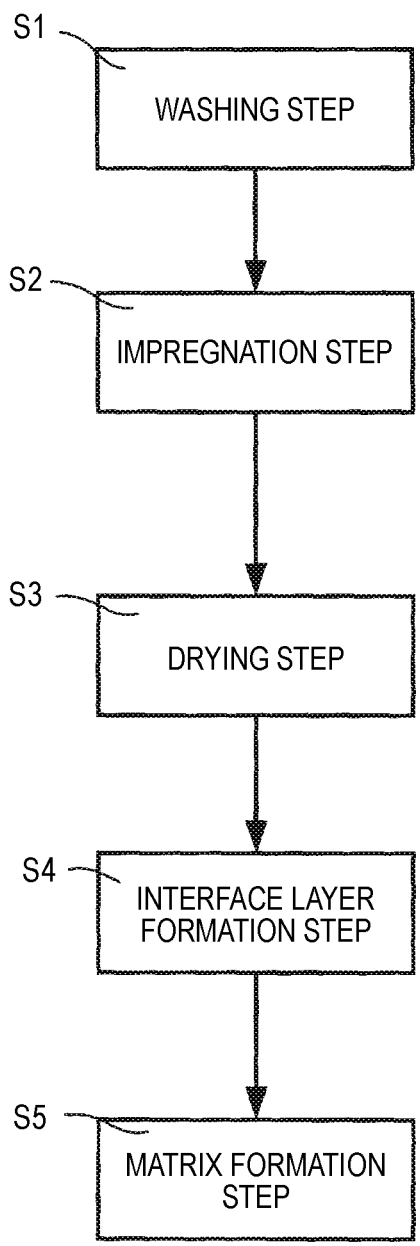
FIGS. 1A and 1B are flowcharts showing production processes of a method for producing SiC/SiC composite material according to the present invention.

A method for producing SiC/SiC composite material according to the present invention is a method for producing SiC/SiC composite material including a substrate formed of a strand formed by bundling a plurality of SiC fibers, and a SiC matrix, and the method includes an impregnation step of impregnating the substrate with a slurry containing particles of a flaky lubricant to obtain an impregnated body; a drying step of drying out a solvent of the slurry from the impregnated body; an interface layer formation step of bending the impregnated body, and transferring the particles of the flaky lubricant to surfaces of the SiC fibers while stretching the particles, to form an interface layer on the surfaces; and a matrix formation step of forming a SiC matrix inside the substrate on which the interface layer is formed.

According to the method for producing SiC/SiC composite material according to the present invention, since the method includes an impregnation step of impregnating the substrate with a slurry containing particles of a flaky lubricant to obtain an impregnated body, a drying step of drying out a solvent of the slurry from the impregnated body, and an interface layer formation step of bending the impregnated body, and transferring the particles of the flaky lubricant to surfaces of the SiC fibers while stretching the particles, to form an interface layer on the surfaces, after the particles of the flaky lubricant are impregnated in the gaps between the SiC fibers, the solvent of the slurry is dried, the impregnated body is bent, and the particles of the flaky lubricant are transferred to the surfaces of the SiC fibers so that a thin interface layer of the flaky lubricant can be formed on the surfaces of the SiC fibers.

In the transfer, the particles are transferred to the fiber surfaces while the particles are stretched. The particles are stretched by rubbing the fibers together. Thus, a thin interface layer can be formed, the particles inside the bundled fibers can be transferred.

Since the flaky lubricant is formed of a hexagonal crystal in which a c-axis direction is bound by a weak bond, when the impregnated body is bent, the crystal is peeled off by the frictional force, and a thin film can be obtained. The flaky lubricant is formed of a layered crystal structure material, and examples thereof include h-BN, carbon, molybdenum disulfide, and tungsten disulfide.

Bending the impregnated body is not particularly limited to rolling a flat body into a cylindrical shape or being a flat body into a corrugated shape, and a body which has been once bent may be returned to its original shape. By this operation, the surface of the flaky lubricant impregnated between the SiC fibers is scraped off, and the lubricant is attached to the SiC fibers, so that the interface layer can be formed.

In the present invention, since the interface layer is an aggregate of particles of the flaky lubricant and is not grown in a vapor phase, the interface layer does not easily become the origin of cracks and is not easily broken even when being bent. Therefore, it is easy to shape a strand after the strand is impregnated with the flaky lubricant. In addition, since the flaky lubricant easily becomes finer, the lubricant is easily spread to the inside of the substrate and thus the aggregate and the matrix can be prevented from being integrated even inside the substrate by a simple method.

It is preferable that the method for producing SiC/SiC composite material according to the present invention adopts the following aspects.

The flaky lubricant includes at least one selected from carbon or boron nitride particles.

Since the flaky lubricant has self-lubricating properties, it is possible to spread the interface layer on the surfaces of the SiC fibers by bending the impregnated body. Since carbon or boron nitride is difficult to be thermally decomposed and does not generate corrosive gas even when decomposed, carbon or boron nitride can be suitably used in the method for producing SiC/SiC composite material of the present invention.

The slurry further contains a binder resin.

Since the slurry used in the impregnation step contains a binder resin, the slurry is firmly attached to the SiC fibers and can be prevented from falling off until the matrix formation step. When the substrate is heated at the matrix formation step, the binder resin is thermally decomposed and removed or carbonized.

The binder resin is not particularly limited but polyvinyl alcohol, epoxy resin, phenolic resin, starch, pitch, isobutylene-maleic acid copolymer, polyvinyl acetate, urethane resin, latex and the like can be used.

The matrix formation step is performed using a CVI method, a PIP method, or a MI method.

The method for forming the matrix in the method for producing SiC/SiC composite material according to the present invention is not particularly limited, but a CVI method, a PIP method, and a MI method can be used.

In a chemical vapor infiltration (CVI) method, so-called vapor phase impregnation method, a matrix is formed by vapor-phase impregnation of SiC in the gap between the SiC fibers on which an interface layer is formed. In a polymer infiltration and pyrolysis (PIP) method, so-called polymer impregnation pyrolysis method, a SiC matrix can be formed by impregnating a substrate with a SiC precursor, and curing and firing the substrate. In a melt infiltration (MI) method, so-called melt impregnation method, after the substrate is impregnated with a carbon source, the substrate is impregnated with molten silicon, and the carbon source is allowed to react with molten silicon, so that a reaction sintered SiC can be obtained. As the carbon source in the MI method, in addition to carbon particles, a carbon precursor and the like can be used. In a case of using carbon particles, the carbon particles can be dispersed in a solvent and impregnated with a carbon source in the form of slurry. In a case of using a carbon precursor, phenolic resin, furan resin, polyvinyl alcohol, epoxy resin, polyvinyl chloride, polyacrylonitrile, pitch, and the like can be used. These carbon precursors are impregnated, then cured and fired so that the substrate can be impregnated with a carbon source.

Before the impregnation step, a washing step of washing the strand is further provided.

The strand formed by bundling the plurality of SiC fibers may be coated with a sizing agent so that the SiC fibers do not fall apart or dirt may be attached to the surfaces of the SiC fibers. Since the SiC fiber is a hard ceramic, when the flaky lubricant is rubbed on the surface, the flaky lubricant can be more efficiently scraped and an interface layer can be formed on the surface. However, when a sizing agent or dirt is attached to the surface, the flaky lubricant is not easily scraped and the adhesion is also reduced. In addition, when the sizing agent is attached, the sizing agent serves as a binder and the SiC fibers are brought into close contact with each other. Thus, it is difficult to introduce the flaky lubricant into the gap between the SiC fibers.

Therefore, when the washing step of washing the strand is provided before the impregnation step, the flaky lubricant can be easily introduced onto the surfaces of the SiC fibers and an interface layer can be more efficiently formed.

In the method for producing SiC/SiC composite material according to the present invention, the SiC fiber to be used is not particularly limited. An amorphous SiC fiber and a crystalline SiC fiber can be used. As the amorphous SiC fiber, a SiC fiber mixed with Ti and Zr (TYRANNO ZMI Grade (registered trademark) manufactured by UBE Industries, Ltd.), a SiC fiber cross-linked by electron beam irradiation and having a reduced oxygen content (HI-NICALON (registered trademark) manufactured by NGS Advanced Carbon Co., Ltd.), and the like can be used. As the crystalline SiC fiber, a SiC fiber containing Al and functioning as a sintering aid to increase the crystallinity of the SiC fiber (TYRANNO SA (registered trademark) manufactured by UBE Industries, Ltd.) can be used.

The fiber diameter of the SiC fiber is not particularly limited and is preferably 5 to 20 µm. When the fiber diameter of the SiC fiber is 5 µm or more, the fiber diameter of the SiC fiber can be sufficiently large compared to the diameter of the flaky lubricant. Thus, the flaky lubricant can be easily attached to the surface of the SiC fiber. When the fiber diameter of the SiC fiber is 20 µm or less, even when the SiC fiber is bent, the tension applied to the surface can be reduced, and thus the SiC fiber can be made difficult to be broken.

The flaky lubricant used in the method for producing SiC/SiC composite material according to the present invention preferably has an average particles diameter of 10 nm to 4 µm. When the average particles diameter of the flaky lubricant is 10 nm or more, the lamination of the flaky lubricant in the c-axis direction can be sufficiently secured, and thus the interface layer can be efficiently formed on the surface of the SiC fiber in the subsequent interface layer formation step. In addition, when the average particles diameter of the flaky lubricant is 4 μm or less, the lubricant is easily introduced into the gap between the SiC fibers and is not easily settled in the solvent. Thus, the interface layer can be efficiently formed on the surface of the SiC fiber in the subsequent interface layer formation step.

The average particle size of the flaky lubricant of the present invention can be measured with a laser diffraction particle size measuring device.

In the washing step, it is preferable to deform the substrate and apply a frictional force between the SiC fibers. When the substrate is deformed and a frictional force is applied, the washing of the surface of the SiC fiber is promoted, the gap between the SiC fibers is formed, and thus the flaky lubricant can be easily introduced. The operation of deforming the substrate in the washing step may be performed while washing is performed or may be performed after washing is completed.

In the impregnation step, it is preferable to deform the substrate and apply a frictional force between the SiC fibers. When the substrate is deformed and a frictional force is applied, a gap is formed between the SiC fibers and thus the flaky lubricant can be easily introduced.

The operation of deforming the substrate performed in the impregnation step is preferably performed while impregnation is performed. By deforming the substrate while performing impregnation, the gap between the SiC fibers can be greatly opened and the flaky lubricant can be easily introduced into the inside. In addition, the flaky lubricant once taken inside can be crushed and thus can be easily more finely introduced.

In the method for producing SiC/SiC composite material according to the present invention, the flaky lubricant preferably has a hexagonal crystal form. When the flaky lubricant has a hexagonal crystal form, the hexagonal crystal form has cleaving properties in the c-axis direction, and thus a thin interface layer can be easily formed.

In a case of a flaky lubricant formed of carbon, graphite, pyrolytic carbon, and the like can be suitably used. In a case of graphite, natural graphite and artificial graphite can be used. In a case of natural graphite, since the degree of graphitization is high and crystallization progresses, the interface layer can be efficiently formed. In the case of artificial graphite, it is possible to obtain an interface layer with high purity and a low impurity content since purified raw materials are used and graphitized at a high temperature. In addition, since pyrolytic carbon is produced from gas, the crystal orientation is high. Among these, highly oriented pyrolytic graphite (HOPG) and the like can be used as pyrolytic carbon with particularly high orientation.

BEST MODE FOR CARRYING OUT THE INVENTION

Embodiment 1

Figure 2A:
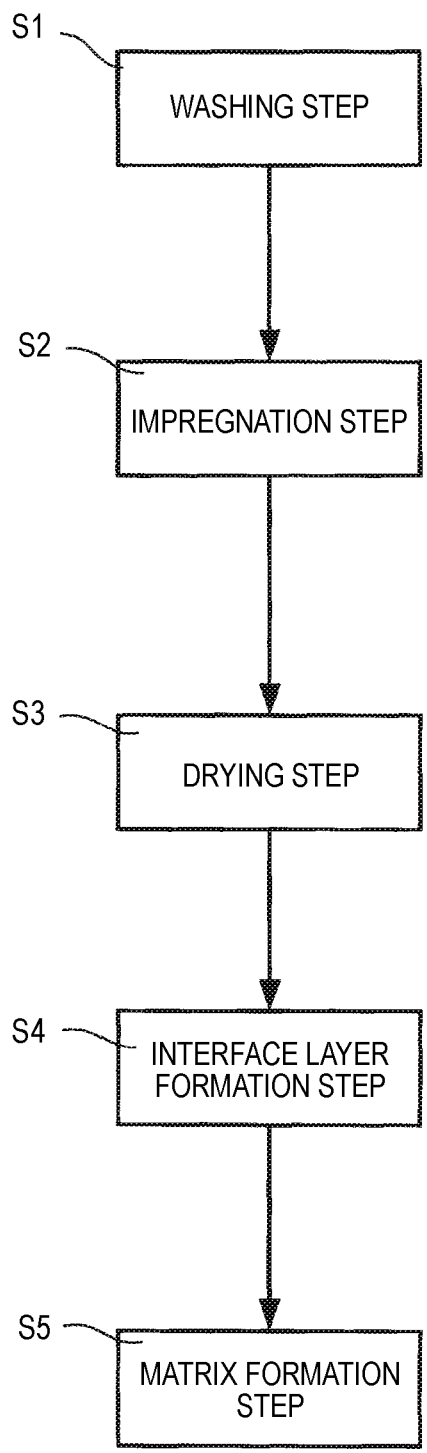
FIGS. 2A and 2B show Embodiment 1 of the present invention.
Figure 2B:
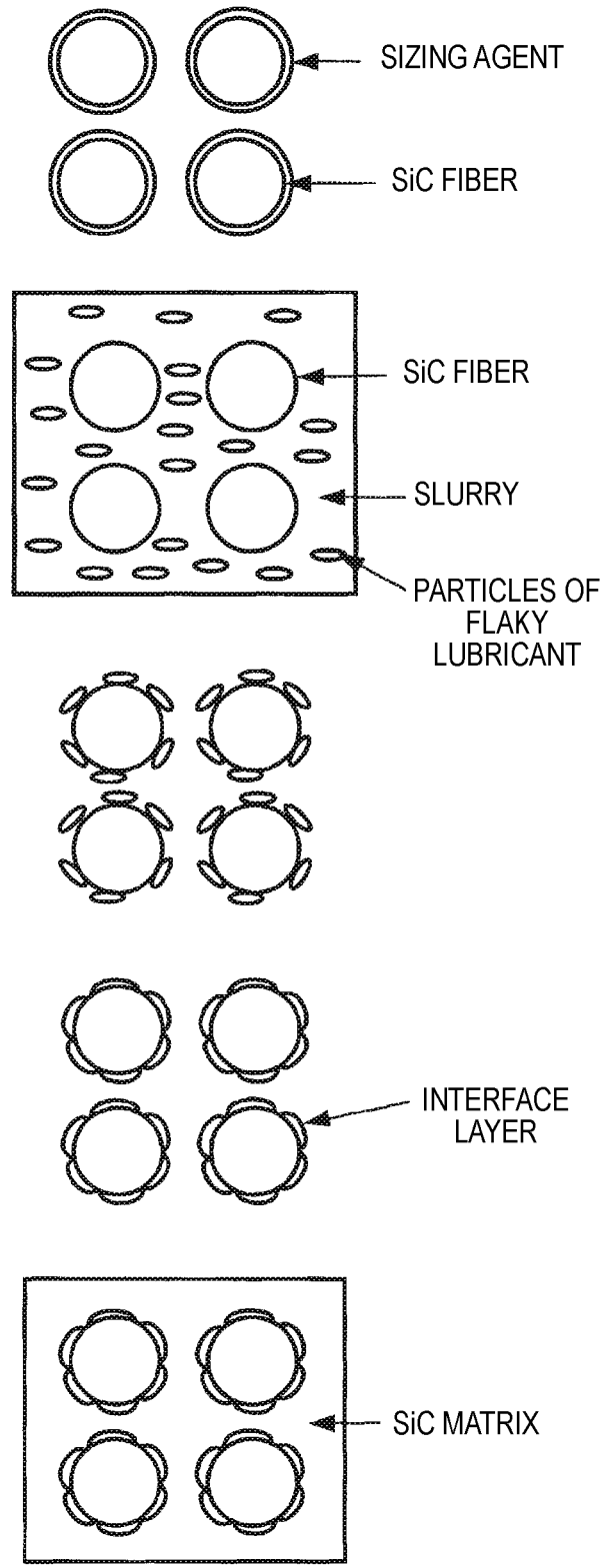

Hereinafter, Embodiment 1 of the method for producing SiC/SiC composite material according to the present invention will be described with reference to FIG. 1A and FIGS. 2A and 2B.

A process of producing a SiC/SiC composite material will be described in order using a plain cloth of a strand formed by bundling SiC fibers (TYRANNO ZMA manufactured by UBE Industries, Ltd.) as a substrate.

<Washing Step: S1>

In Embodiment 1, strands formed by bundling SiC fibers are bundled into one by a sizing agent. Since the sizing agent causes the SiC fibers to be brought into close contact with each other, in order to separate the fibers from each other, the woven fabric is immersed in hot water at 60° C. While the woven fabric is immersed in hot water, the woven fabric is deformed, the SiC fibers are pulled apart, and the sizing agent is dissolved in the hot water to expose the surfaces of the SiC fibers.

Next, the woven fabric of SiC fibers from which the sizing agent is removed is placed and dried in a dryer. By this operation, the surfaces of the SiC fibers are washed, and thus an interface layer can be easily formed in the following step.

<Impregnation Step: S2>

Next, the washed woven fabric is immersed in a slurry in which boron nitride particles are dispersed as a flaky lubricant, and the boron nitride particles are introduced between the SiC fibers. In a suspension, the SiC woven fabric are bent and the boron nitride particles are spread in the gaps between the SiC fibers. In the suspension, boron nitride (h-BN) is dispersed to a solid content of 0.03%. The used BN was AP-170S manufactured by Maruka Corporation. The primary particle diameter was 0.05 μm and the specific surface area was 170 $m^2/g$.

<Drying Step: S3>

Next, the solvent of the slurry is dried and the flaky lubricant is fixed in the gaps between the SiC fibers. As for drying, the solvent of the slurry is sufficiently dried using a dryer at 120° C. until there is no weight loss.

<Interface Layer Formation Step: S4>

The flaky lubricant attached to the surfaces of the SiC fibers is transferred to the surfaces of the SiC fibers. By repeatedly bending the woven fabric to the front and back, the flaky lubricant attached to the surfaces of the SiC fibers is rubbed and attached to the surfaces of the SiC fibers to form a thin interface layer. Since the woven fabric is bent in this manner, an interface layer can be formed not only on the surface of the woven fabric but also on the internal SiC fibers.

In the interfacial layer formation step S4, a substrate having a desired shape is obtained by bending the woven fabric. Since the substrate has a cylindrical shape in the example, the SiC woven fabric is rolled and five layers are laminated to obtain the substrate. Since the SiC woven fabrics are impregnated layer by layer, the flaky lubricant can be spread to the inside of the substrate.

<Matrix Formation Step: S5>

The obtained cylindrical substrates are placed in a CVI furnace, and SiC is vapor-phase grown in the gap between the SiC fibers. In the process of heating the substrate in the CVI (CVD) furnace for vapor phase growth, the binder resin is pyrolyzed and carbonized. Therefore, a thin film, in which boron nitride and carbon are mixed, is formed around the SiC fibers to form an interface layer. In addition, SiC grown on the interface layer is formed between the SiC fibers.

Since the interface layer can be formed by a low-temperature process in Embodiment 1, the entire process can be simplified. Therefore, a SiC/SiC composite material can be obtained at a low cost. In addition, since the flaky lubricant is a powder, after the woven fabric is impregnated with the flaky lubricant, the fibers are not easily broken even when the fibers are bent, and thus a SiC/SiC composite material having an interface layer reaching inside of the substrate can be easily obtained.

Embodiment 2

Figure 1B:
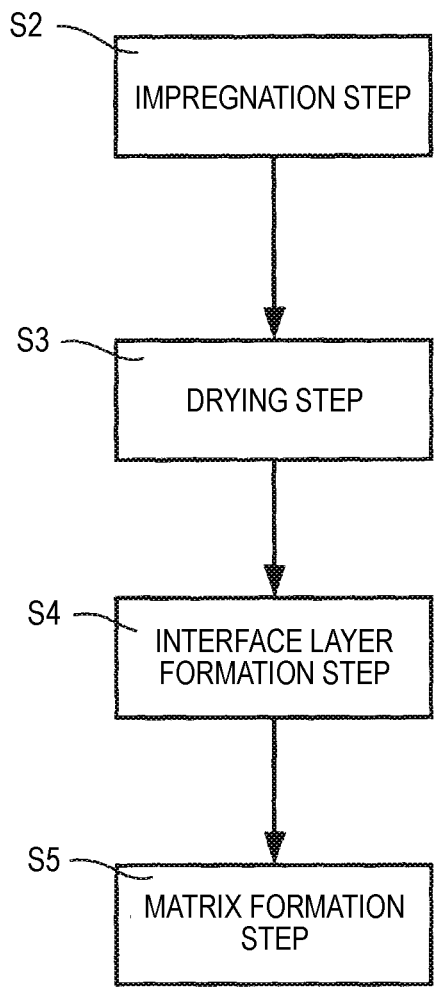
Figures 3A, 3B:
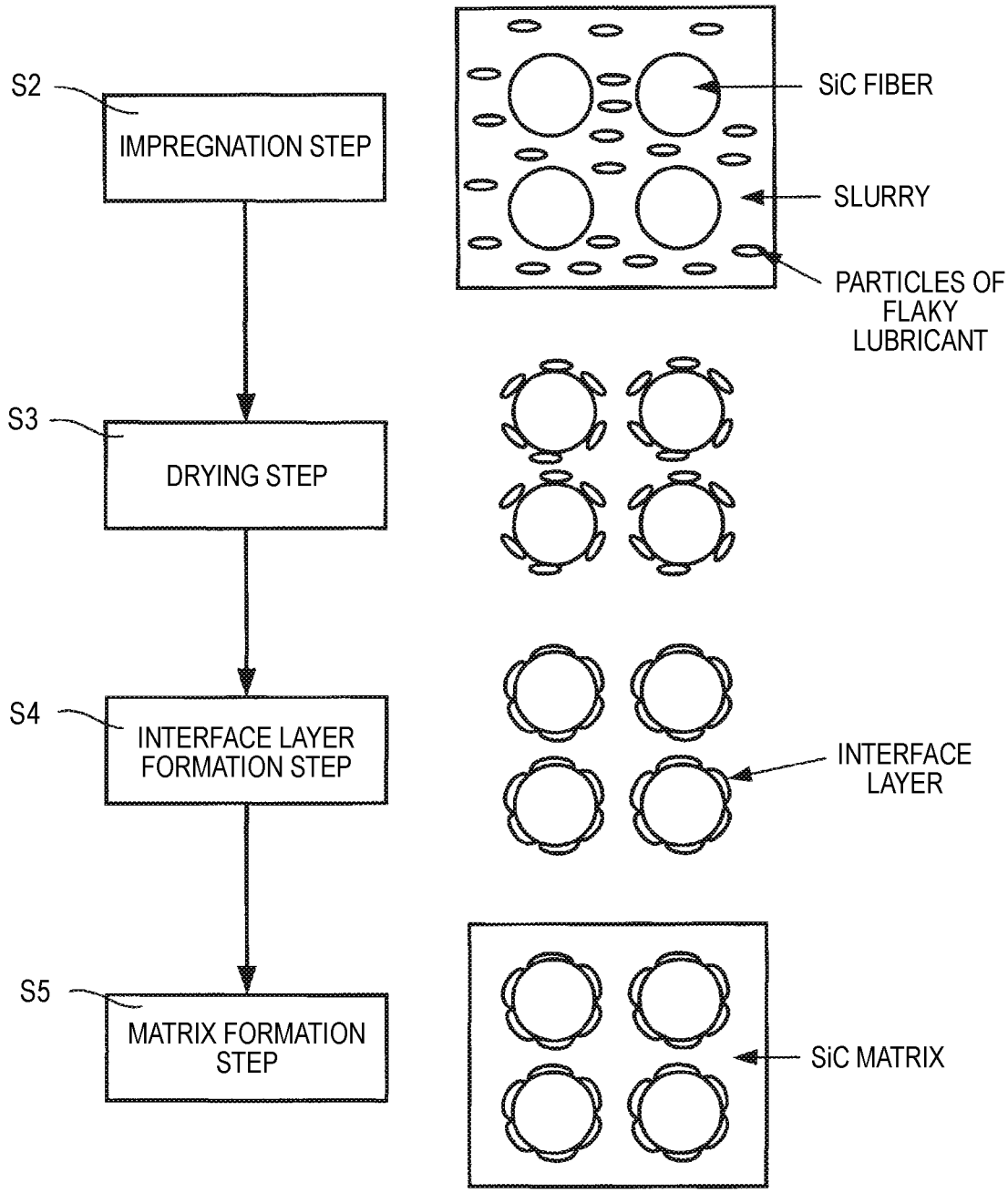
FIGS. 3A and 3B show Embodiment 2 of the present invention.

Embodiment 2 of the method for producing SiC/SiC composite material according to the present invention will be described with reference to FIG. 1B and FIGS. 3A and 3B.

In Embodiment 2, since the woven fabric of SiC fibers not containing a sizing agent is used, the washing step S1 is not performed. In addition, the matrix formation step S5 adopts a MI method instead of the CVI method. That is, the process up to the drying step S3 is the same except that the washing step S1 is not performed, and the matrix formation step S5 will be described.

<Matrix Formation Step: S5>

A substrate on which a woven fabric formed of SiC fibers with an interface layer formed on the surface is laminated is impregnated with a carbon precursor. As the carbon precursor, a phenolic resin is used, the substrate is impregnated with the phenolic resin, and then the resin is cured by heating. The carbon precursor is carbonized by further firing and becomes a carbon source of a SiC matrix. In this manner, when the substrate impregnated with the carbon source is impregnated with molten silicon, and the molten silicon is allowed to react with the carbon source. Thus, a SiC matrix of reaction sintered SiC can be obtained.

In Embodiment 2, since the interface layer can be formed by a low-temperature process, the entire process can be simplified. Therefore, a SiC/SiC composite material can be obtained at a low cost. In addition, since the flaky lubricant is a powder, after the woven fabric is impregnated with the flaky lubricant, the origin of cracks is not easily generated on the interface layer even when the fibers are bent and thus a SiC/SiC composite material having an interface layer reaching inside of the substrate can be easily obtained.

The present invention is not limited to the above-described embodiments, and can be appropriately modified, improved, and the like. In addition, the material, shape, dimensions, numerical value, form, number, arrangement location, and the like of each component in the above-described embodiments are arbitrary as long as the present invention can be achieved, and are not limited.

The present application is based on Japanese Patent Application No. 2017-103988 filed on May 25, 2017, the content of which is incorporated herein by reference.

INDUSTRIAL APPLICABILITY

Since the fibers are not broken even when the fibers are bent and an interface layer reaching inside of the substrate is provided, the method for producing SiC/SiC composite material according to the present invention can be applied to fields, such as heat resistant parts such as gas turbines, jet engine blades and shrouds, nuclear reactor parts, high-temperature reactor equipment parts, and the like, which require heat resistance and oxidation resistance.

REFERENCE SIGNS LIST

S1: WASHING STEP
S2: IMPREGNATION STEP
S3: DRYING STEP
S4: INTERFACE LAYER FORMATION STEP
S5: MATRIX FORMATION STEP

The invention claimed is:

1. A method for producing SiC/SiC composite material including a substrate formed of a strand formed by bundling a plurality of SiC fibers, and a SiC matrix, the method comprising steps of:
   impregnating the substrate with a slurry containing particles of a flaky lubricant formed of a material having a layered crystal structure and having a first particle size to obtain an impregnated body, wherein the substrate comprises at least one bundle of SiC fibers,
   drying out the slurry to remove a solvent thereof from the impregnated body;
   bending the impregnated body to modify the particles of the flaky lubricant having the first particle size, and dislodge particles of the flaky lubricant having a second particle size from the fibers, the second particle size being smaller than the first particle size;
   forming an interface layer on surfaces of the SiC fibers by attaching the dislodged particles of the flaky lubricant, having the second particle size, to the surfaces of the SiC fibers; and
   forming a SiC matrix inside the substrate on which the interface layer is formed using chemical vapor infiltration, polymer infiltration and pyrolysis, or melt infiltration.

2. The method for producing SiC/SiC composite material according to claim 1, wherein the flaky lubricant includes at least one selected from the group consisting of carbon particles and boron nitride particles.

3. The method for producing SiC/SiC composite material according to claim 1, wherein the slurry further contains a binder resin.

4. The method for producing SiC/SiC composite material according to claim 1, further comprising a step of washing the strand before the impregnation step.

* * * * *